United States Patent [19]

Baan

[11] Patent Number: 5,332,005
[45] Date of Patent: Jul. 26, 1994

[54] LAMINAR FLOW ELEMENT AND METHOD FOR METERING FLUID FLOW

[75] Inventor: Tibor Baan, Monsey, N.Y.

[73] Assignee: Aalborg Instruments & Controls, Inc., Monsey, N.Y.

[21] Appl. No.: 973,172

[22] Filed: Nov. 6, 1992

[51] Int. Cl.$^5$ ............................. F15D 1/02; G01F 5/00
[52] U.S. Cl. ................................. 138/43; 73/202
[58] Field of Search ................. 73/202, 202.5, 203; 138/43, 46, 41

[56] References Cited

U.S. PATENT DOCUMENTS

| | | | |
|---|---|---|---|
| 2,304,689 | 12/1942 | Hanson | 138/46 |
| 3,361,162 | 1/1968 | Prestridge et al. | 138/43 |
| 3,562,782 | 2/1971 | Zychal | 138/43 |
| 3,792,609 | 2/1974 | Blair et al. | 73/202 |
| 3,805,610 | 4/1974 | Jacobs | 73/202.5 |
| 3,868,973 | 3/1975 | Bierman et al. | 138/43 |
| 4,315,431 | 2/1982 | Hawk | 73/203 |
| 4,843,881 | 7/1989 | Hubbard | |

OTHER PUBLICATIONS

Process Gas Mass Flow Controllers-Part 1, An Overview; May, 1986; Dr. John G. Olin; Sierra Instruments; Carmel Valley, CA, 93924; P. 4, FIG. 8.

Primary Examiner—Herbert Goldstein
Attorney, Agent, or Firm—Martin Parkinson

[57] ABSTRACT

A device and method for creating favorable conditions for achieving adjustable laminar fluid flow is described. In the practical example of a thermal mass flow meter the laminar flow element contains a porous, open celled, flexible material such as stainless steel mesh. The mesh creates a labyrinthine flow path, for the creation of laminar fluid flow, within the laminar flow element. Means for compressing or elongating the steel mesh renders the laminar flow element adjustable over an extended fluid flow range, and provides optimal fluid dynamics.

3 Claims, 7 Drawing Sheets

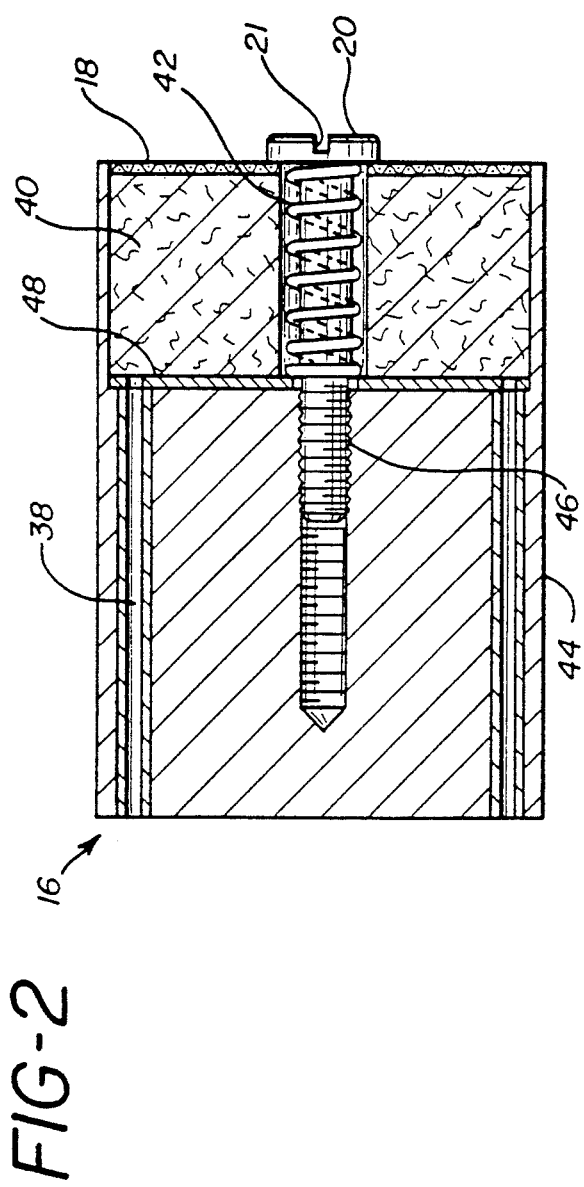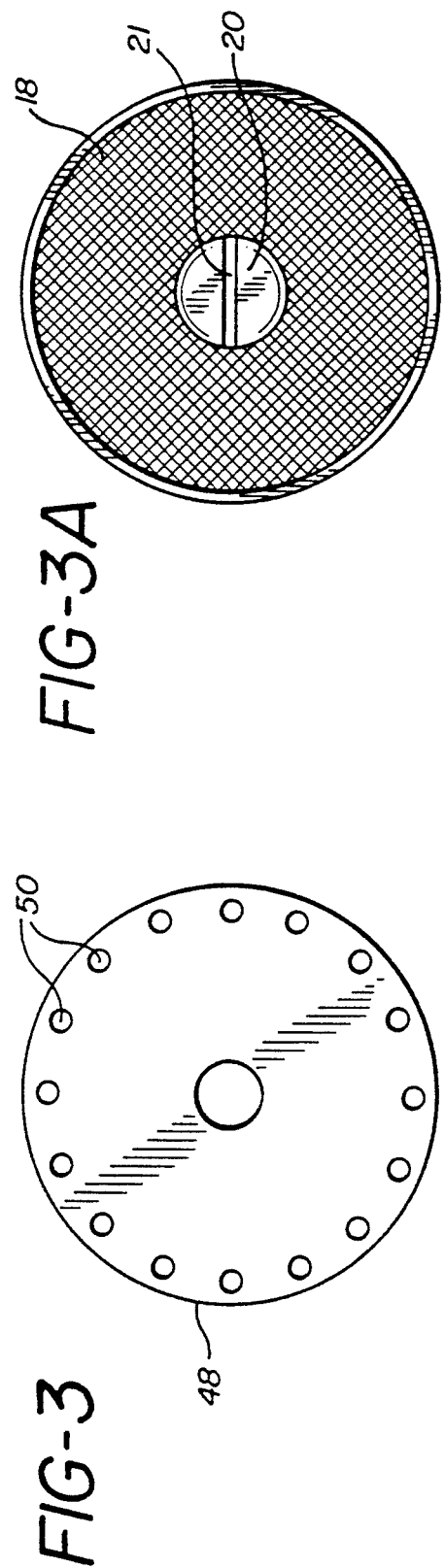

LAMINAR FLOW ELEMENT AND METHOD FOR METERING FLUID FLOW

BACKGROUND OF THE INVENTION

This invention relates to laminar flow elements as employed in thermal mass flow meters, and in particular to a laminar flow element that is adjustable over an extended fluid flow range.

Thermal mass flow meters are essential monitoring devices for many laboratory and commercial applications. They are routinely employed in semiconductor equipment fabrication, vacuum processes such as vapor deposition, and petrochemical, pharmaceutical, and food processing industries. Their main use is in metering gas flow, and controlling gas flow when used in conjunction with a mass flow controller. In general there are two main methods for metering gas flow; volumetric, and mass based. A problem with volumetric metering is that this type of measurement is dependent on knowing the temperature and pressure of the gas for accurate results. Obviously using volumetric metering operators must recalibrate their equipment for each condition that applies to the gas metering being performed. With a mass flow based system on the other hand, the sensor within the thermal mass flow meter is not significantly effected by changes in temperature and pressure. This is because sensing of gas flow is done by a mass of gas as it passes through a sensing conduit. This is called "Pound Molecular Weight Flow". The process can be envisioned as each molecule of the gas carrying an amount of heat from point A in a sensor conduit to point B in that conduit, with temperature and pressure variations playing an insignificant role.

In a typical thermal mass flow meter incoming gas is split into two streams by an appropriately selected restriction device often referred to as a laminar flow element, or a restrictor flow element. A fixed portion of the gas stream is thus forced to flow through a by-pass conduit, which is the sensor tube for the gas flow. The major portion of the gas stream flows through the length of the other conduit containing the laminar flow element.

The basic concept of the thermal mass flow meter is that if the gas flow is laminar in both the sensor tube and conduit containing the laminar flow element, then the ratio of the flow detected through the sensor tube (Qs), and the flow rate through conduit containing the laminar flow element (Qm) are proportional to one another according to the following equation:

$$\frac{Qs}{Qm} = K \text{ (the actual flow rate)}$$

In U.S. Pat. No. 4,843,881, issued Jul. 4, 1989, a mass flow sensing system suitable for making use of the instant invention is described, the disclosure of which is hereby incorporated by reference. U.S. Pat. No. 4,843,881 teaches the use of two heated resistor windings on the outer surface of a thin walled, stainless steel sensor tube to impart heat to the gas medium flowing through the sensor tube. When no flow is taking place both windings are kept at the same temperature. During gas flow heat is carried from the winding near the gas flow inlet to a winding further along the length of the sensor tube in the direction of the gas flow outlet, which results in proportional changes in the temperature of the windings. These changes in temperature of the windings results in changes of resistance values of the windings. Each winding is part of a Wheatstone bridge. Instantaneous resistance values are detected by the Wheatstone bridges, and by means of an amplifier circuit an analog output signal of 0 to 5 Vdc (volts, direct current) or 4 to 20 ma (milliamps) is obtained. The sensor tube is appropriately calibrated to indicate the flow rate of the combined gas flow rates taking place in both the sensor tube and in the conduit containing the laminar flow element.

As can be seen from the above description the concept of laminar flow is essential to understanding the functioning of a thermal mass flow meter. Laminar flow is layered, orderly, non-turbulent flow. Laminar flow is defined by a dimensionless number called the "Reynolds Number" which is expressed by the following formula:

$$Rn = \frac{pDV}{u}$$

where:
p=density of gas (Gm/cc)
D=inside diameter of conduit (mm)
V=velocity of gas flow (mm/sec)
u=viscosity of gas (centipoise)

Fluid flow characterized by a Reynolds Number of less than 2,000 is considered laminar fluid flow.

In the current state of the art in thermal mass flow meter designs laminarity of fluid flow is obtained by the sensor tube being a long, thin walled, capillary tube, with the ratio of length to internal diameter of the capillary tube generally being of the order of 25 to 1. The major portion of the fluid flows through a conduit containing a laminar flow element carefully designed to both restrict fluid flow, and to do so in a manner that most favors the creation of a laminar fluid flow. A wide variety of laminar fluid flow elements are used with different sizes and even geometric attributes to achieve the desired flow domain for different applications. Currently laminar flow element designs necessitate a large number of different laminar flow elements to be kept on hand, with generally cumbersome resultant calibrating procedures. The instant invention on the other hand provides an adjustable laminar flow element so that optimal laminar flow fluid dynamics are obtained over an extended flow range, and by one single laminar flow element.

It is therefore a primary object of the invention to provide a means for obtaining adjustable laminar fluid flow over an extended fluid flow range.

A further object is to provide a laminar flow element for achieving optimal fluid dynamics.

Another object is to provide a single laminar flow element to be used over extended ranges of fluid flow.

Still another object is to provide a cleanable laminar flow element.

An additional object is to provide a laminar flow element that is less susceptible to contamination.

Another object is to provide a combined laminar flow element and desiccant.

A further object is to provide a combined laminar flow element and anti-static device.

Another object is to provide a laminar flow element that can be calibrated by end users of this equipment.

SUMMARY OF THE INVENTION

These objects and other objects are obtained with the instant invention of an adjustable laminar flow element. In the current state of the art rigidly defined, non-adjustable geometries are utilized to fabricate laminar flow elements. In a typical thermal mass flow meter calibrations are accomplished by comparing a known primary flow indicating instrument with a voltmeter (or ammeter) connected to the output terminals of the process transmitter (i.e. the complete thermal mass flow meter instrument). An adjustable potentiometer ("zero" adjustment) is used to adjust the output at zero flow conditions to zero reading on the voltmeter. Another potentiometer ("span" adjustment) is used to adjust the output at maximum desired flow rates (usually 5 volts direct current reading). Alternatively, when desired, an ammeter is used to adjust the "span" to 20 milliamps, or some other value. A desirable linear response would then be sought by verifying the resultant flow reading at various percentages of the maximum flow to correspond to similar percentages of the maximum voltage (or current) readings. At present these rigid, non-adjustable laminar flow elements cause non-linear conditions. To compensate, manufacturers build two or more additional "trimmer" potentiometers into the control circuits of their thermal mass flow meters to permit two or more points to be "pulled" into linearity within stated tolerances.

In the instant invention a porous, open celled, flexible material partially or completely fills a conduit to be used as a laminar flow element. This material can be a plastic or rubber foam, for example, or an inorganic or organic aerogel. Other suitable materials include "Fiberglas" (a registered trademark of Owens-Corning Fiberglas), and metal meshes such as copper and steel wool. A steel wool type mesh made up out of type 316 stainless steel has been found to be a preferred embodiment, since type 316 stainless steel is well accepted by the semiconductor industries.

The stainless steel mesh is placed within the laminar flow element partially or completely filling the laminar flow element depending on proposed applications. Two discs, one at each end of the steel mesh, are connected together to provide the means for compressing or elongating the steel mesh. The two discs are connected together by means of a threaded bolt, with a compression spring being located on a portion of the threaded bolt adjacent the disc that is to be moved forward or backward within the laminar flow element. The combined action of the two discs, the threaded bolt, and the compression spring provide the mechanism for either compressing the steel mesh within the laminar flow element or elongated said steel mesh, and, of course, either disc can be made movable relative to the other.

Referring back to the equation for the Reynolds Number it can be seen that decreasing the equivalent diameter (De) across which fluid flow takes place, and reducing the velocity (V) of the fluid, flow conditions with Reynolds Numbers corresponding to a more laminar flow of a fluid conduit result. By placing a material such as the above described stainless steel mesh within a conduit to serve as a laminar flow element provides a labyrinthine flow path which contributes positively to creating laminar flow conditions. Such materials when installed into a conduit to be used as a laminar flow element result in an equivalent flow area (De) which is smaller than the original unimpeded cross-sectional area (D) of the circuit- Fluid velocities will be lower as well.

When the above described adjustable laminar flow element is applied to a practical application such as a thermal mass flow meter an adjustable laminar flow element will be of advantage since a single laminar flow element will suffice for a specific flow capacity domain that in the present state of the art requires many different laminar flow elements. For example, currently a different laminar flow element would be required for a gas flow range of 0-10 mil/min.; 0-50 mil/min.; and so on to 0-1 liter/min.; 0-15 liters/min. With the improved, adjustable laminar flow element of the invention only one laminar flow element is required for the entire described gas flow domain.

The laminar flow element of the invention is also less susceptible to defects caused by contaminating particles entering the laminar flow element, or contaminants that can occur with reactions within the element. These contaminants can cause inaccuracies in fluid flow readings or render the thermal mass flow meter inoperative. The labyrinthine flow path of the laminar flow element of the invention minimizes the possibility of such inactivation caused by these contaminations.

Other advantages of this adjustable, labyrinthine laminar flow element design include the fact that desiccant particles, such as silica gel or molecular sieves can be placed within the steel mesh so that the element also acts as a means for moisture or other solvent removal from incoming streams of gas. In addition, the steel mesh can be coated with an anti-static material as an added safety precaution when dealing with flammable gases such as hydrogen or methane. It should also be noted that by its very nature the steel mesh adds to process safety by acting as a flash arrestor.

While the invention has been primarily described as being useful for laminar flow elements in thermal mass flow meters, it should be noted that the principle of compressing or elongating a porous, open celled, flexible material to favor the creation of laminar fluid flow can, of course, be employed for any application wherein favoring laminar fluid flow is desirable.

The mechanism to compress or elongate the porous material within the laminar flow element has been described as two discs being movably connected together by means of a threaded bolt. Obviously many other methods can be employed to compress or elongate the porous material, either with or without discs, including motor driven pistons, magnetic devices placed within or without the element, and so on.

BRIEF DESCRIPTION OF THE DRAWINGS

FIG. 2 is a sectional, side elevational view of one possible embodiment of the laminar flow element of the invention.

FIG. 3 illustrates one possible disc of the invention for compressing or elongating a steel mesh.

FIG. 3A illustrates one possible disc of the invention for compressing or elongating a steel mesh.

DETAILED DESCRIPTION OF THE PREFERRED EMBODIMENTS

Figure 1:
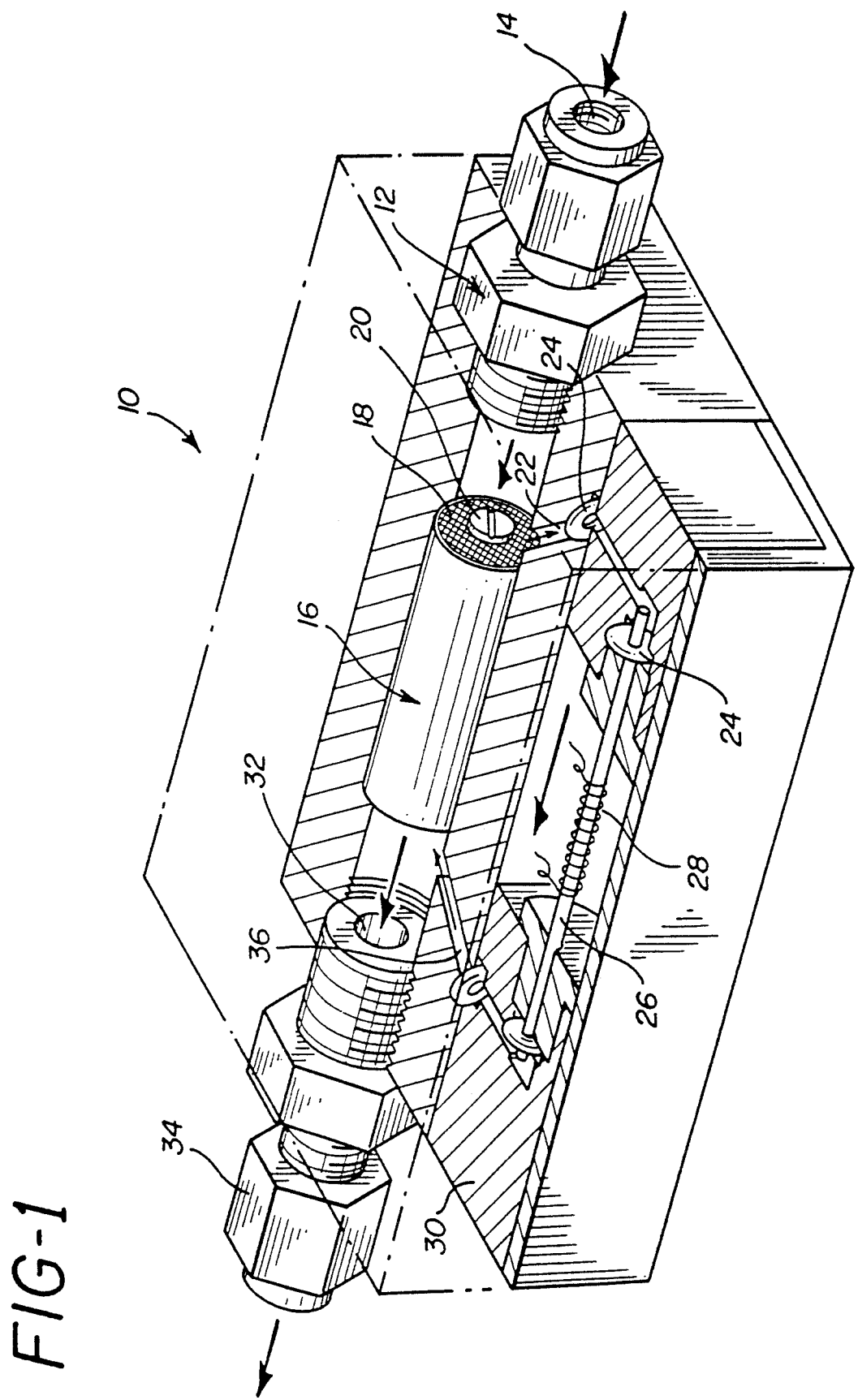
FIG. 1 is a sectional, plan view of a thermal mass flow meter, showing the laminar flow element of the invention in place.
Figure 4:
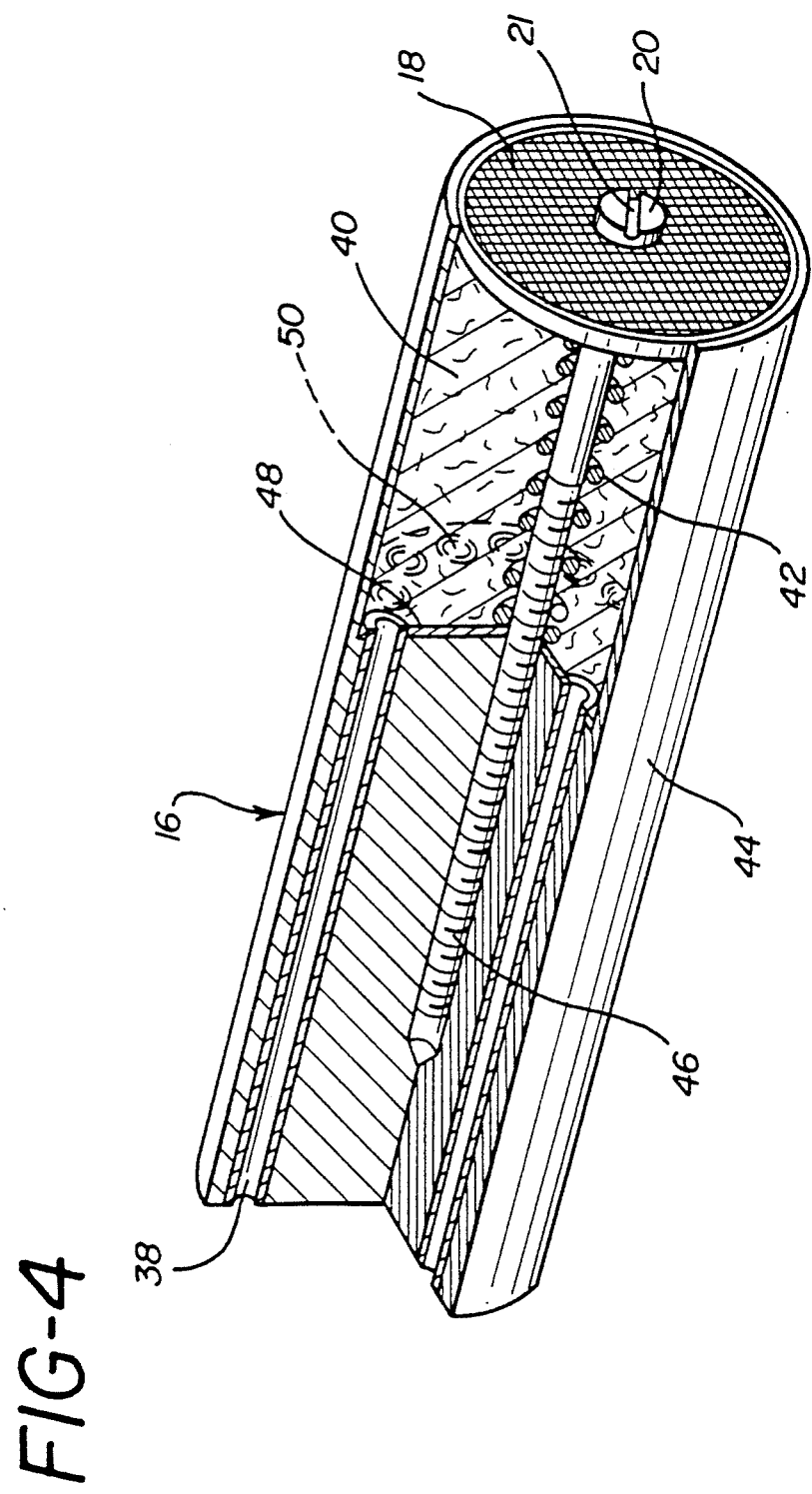
FIG. 4 is a sectional plan view of the laminar flow element of FIG. 2.

Referring now to FIG. 1, a thermal mass flow meter 10 is shown, with a laminar flow element 16 of the invention in place within the thermal mass flow meter 10. A main body 30 of the flow meter houses the laminar flow element through which the main portion of the fluid to be metered will flow, and also the shunt 22 connected by means of O rings 24 to a conduit 26 which is the sensor tube of the flow meter. Heating coils 28 are wrapped around the outer surface of the sensor tube 26. After the gas flow through the sensor tube 26 has been metered, this gas re-joins the main flow of gas emanating from the laminar flow element 16 after the main portion of the gas has passed through the element. An inlet fitting 12 with fluid inlet opening 14, and an outlet fitting 34 with outlet opening 32 are removable from the body 30 for the placement or removal of the element 16. Screen disc 18 is shown in place with a threaded bolt 20 affixed to the disc at the fluid inlet portion of the laminar flow element 16. In operation a fluid, typically a gas, is introduced at the inlet portion 14 of the thermal mass flow meter 10 (which is often also referred to as a process transmitter), a portion of the gas is shunted into a conduit 22, and thence into sensor tube 26, while the main portion of the gas flows through the laminar flow element 16. It should be noted that FIG. 1 is a sectional illustration of the flow meter of the invention, with the main body 30 shown sliced approximately in half to illustrate the internal functioning of the flow meter 10. With the body 30 intact (shown in phantom) the inlet fitting 12 and outlet fitting 34 thread into the body 30, and the laminar flow element 16, and sensor tube 26 are completely enclosed within the main body 30. After the gas is metered by means of heating coils 28 which are wrapped around the long, thin walled capillary tube which comprises the sensor tube 26, the shunted gas re-joins the main portion of the gas (via opening 36) emanating from the other end of the laminar flow element, and all of the gas then exits the thermal mass flow meter at the outlet opening 32. Since the geometry of the sensor tube 26 provides a laminar flow within the sensor tube 26, and the internal construction of the laminar flow element 16 causes laminar flow to occur in this element, the flow in both conduits are proportional to each other. An "upstream", "downstream" heating effect caused by the heating coils 28 are detected by two Wheatstone bridges (not shown), and an amplifier circuit (not shown) provides an analog output signal calibrated in flow rates (not shown) of 0 to 5 volts direct current, or 4 to 20 milliamps, to provide an accurate calibrated metering of total fluid flow rate. The thermal mass flow meter 10 can be fabricated in a variety of materials such as suitable plastics or metals. For the semiconductor industries and certain pharmaceutical applications type 316 stainless steel and "Teflon" (Teflon is a registered trademark of E.I. dupont deNemours) are preferred materials of fabrication for those portions of the flow meter that may come in contact with the fluid being metered.

FIGS. 2, 3, 3A, and 4 illustrate the details of one embodiment of the laminar flow element of the invention. Type 316 stainless steel mesh 40 is shown sandwiched in between the movable screen disc 18, and the perforated, solid fixed disc 48. The main body 44 of the laminar flow element 16 is "Teflon" with conduits 38 in "Teflon" body 44 matching apertures 50 within the solid, non-movable disc 48 to provide a fluid flow path for fluids passing through the laminar flow element 16 from the element fluid entrance point at the movable screen disc 18, then through steel mesh 40, into the conduits 38, then exiting the element 16 through the apertures 50 in non-movable disc 48. The threaded bolt 20 movably connects the movable screen 18 and non-movable disc 48 together, with the end of the bolt 20 being connected to matching threads 46 within the "Teflon" body 44. A compression spring 42 is placed over the threaded bolt 20 to provide tension for either compressing or elongating the steel mesh 40 in between discs 18 and 48. Turning the slot 21 (FIG. 4) in the head of the threaded bolt 20 either clockwise or counterclockwise causes the movable disc 18 to either compress or elongate the steel mesh 40. If desired the steel mesh can be connectedly intertwined within itself with both ends of the mesh being affixed to the fixed and movable discs 48 and 18 respectively to insure elongation of the mesh when required.

Thus the fluid entering through the screen disc 18 is forced to traverse a labyrinthine flow path which favors the creation of laminar fluid flow as has been previously discussed. The labyrinthine flow path is relatively easily adjusted to accommodate an extended domain of fluid flow ranges by simply compressing or elongating the steel mesh 40 by means of discs 18 and 48, and the threaded bolt 20. While the preferred materials of fabrication in this example are type 316 stainless steel for the discs, bolt, and mesh with "Teflon" used for the body of the laminar flow element, other suitable plastics and metals, and other materials including glass can be used for other applications. The simple method employed for compressing or elongating the mesh of tightening or loosening a threaded bolt could also be accomplished by a wide variety of other means, such as by motor driven pistons, or by magnets placed within or outside of the laminar flow element, and so on.

FIGS. 3, and 3A illustrate how a variety of different types of discs can be used, depending on the application. The non-movable disc 48 has apertures 50 which match conduits 38 in the laminar flow element 16 so as to provide a directional flow to the fluid flow emanating from the element 16.

Figure 5:
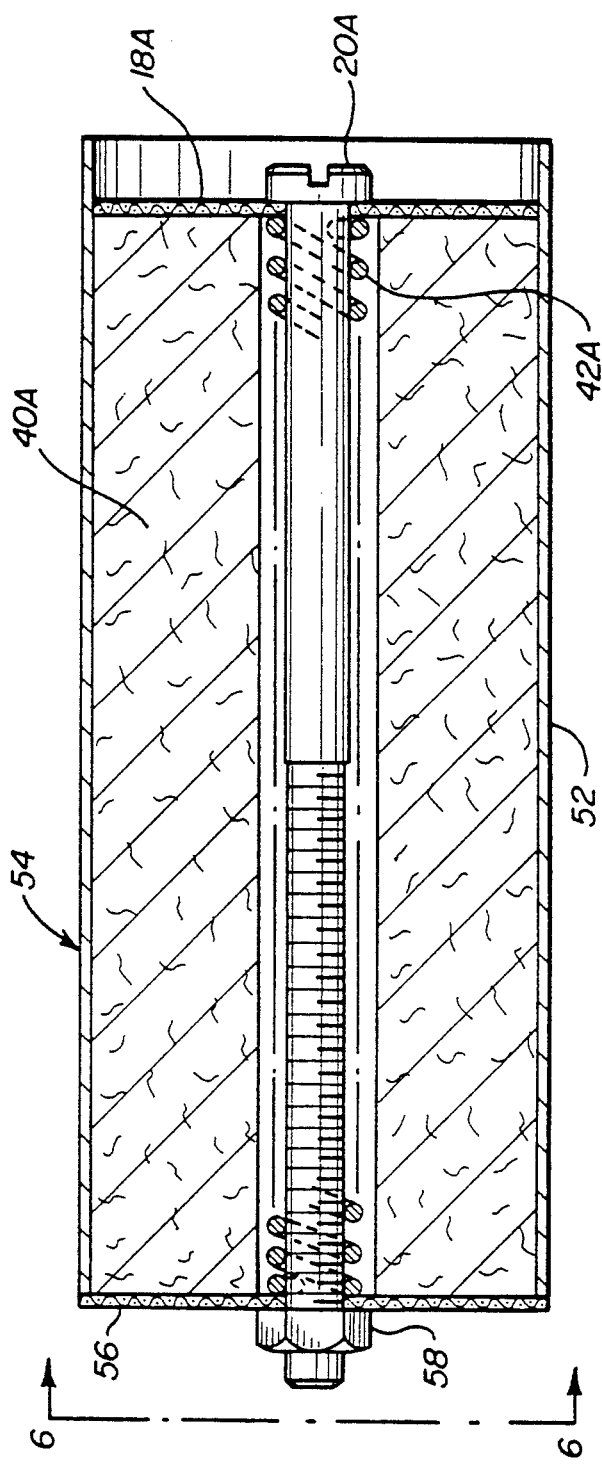
FIG. 5 is a sectional, side elevational view of one possible laminar flow element of the invention.
Figure 6:
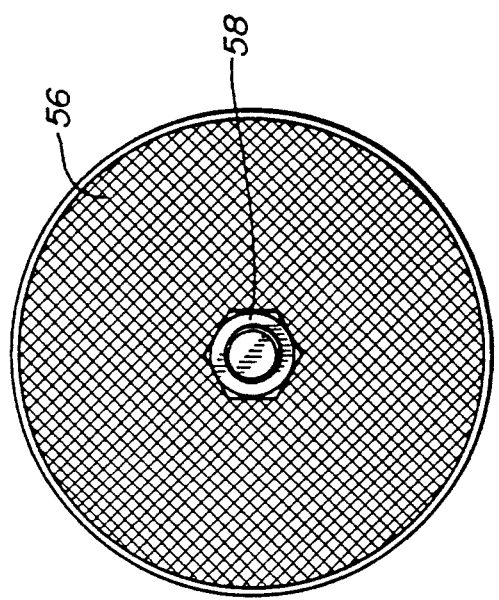
FIG. 6 illustrates the fixed, non-movable screen disc of FIG. 5, taken along the line 6—6 of FIG. 5.
Figure 7:
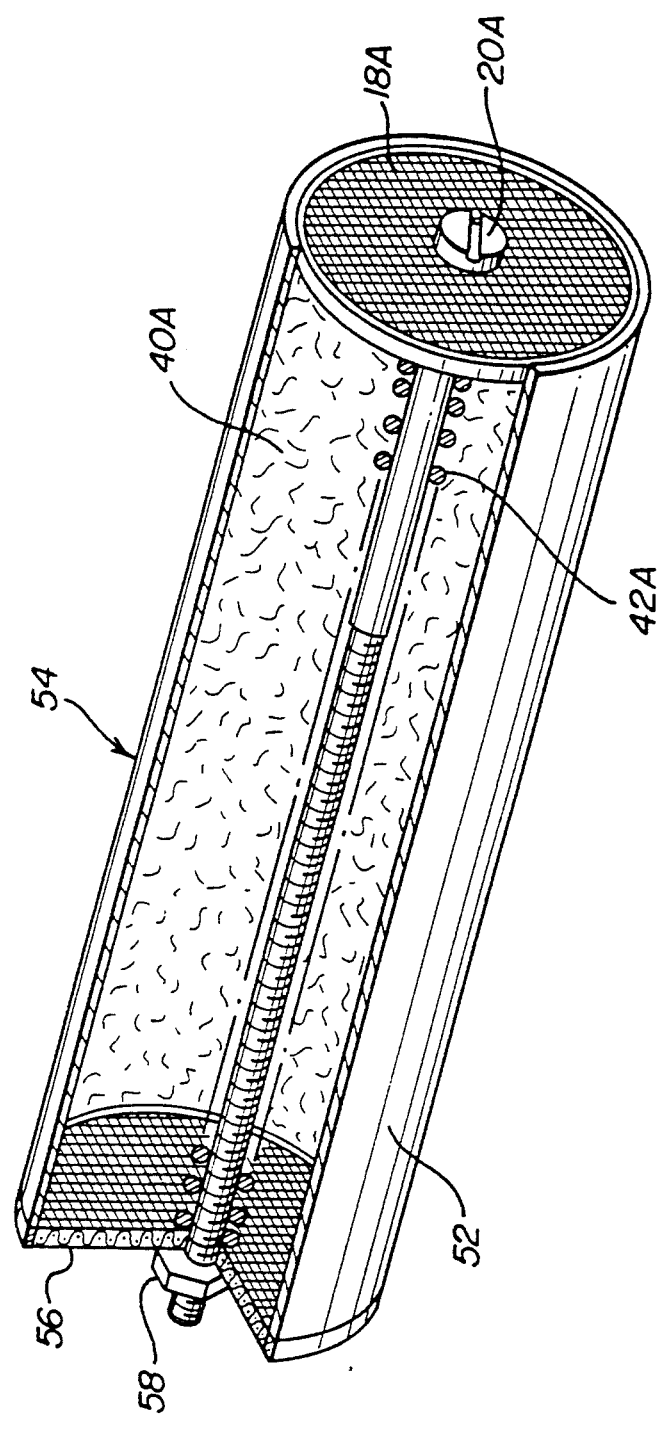
FIG. 7 illustrates another possible laminar flow element of the invention.

FIGS. 5, 6, and 7 illustrate a second embodiment of the laminar flow element 54 of the invention. Steel mesh 40A is shown filling the body 52 of the element 54, with a threaded bolt 20A extending the full length of the laminar flow element 54. A movable screen disc 18A is mounted at the fluid inlet portion of the element 54, and a similar screen disc 56 is affixed to the other end of the element 54 in a non-movable manner. A threaded nut 58 is affixed to the non-movable screen disc 56. The threads on the bolt 20A connect to the threads within the nut 58 so that when the bolt 20A is turned in a clockwise or counterclockwise direction the bolt is caused to advance through or to back away from the nut 58. A compression spring 42A is mounted on the outside of bolt 20A to provide tension when advancing or retreating the bolt 20A. The head of bolt 20A is on the outer surface of the movable screen disc 18A, away from the steel mesh 40A, so that as the bolt 20A advances within the laminar flow element 54, the movable screen disc 18A is caused to move towards the fixed screen disc 56, compressing the steel mesh 40A. Or when the bolt 20A is turned so as to retreat from the nut 58, the movable screen disc 20A is caused to move away from fixed screen disc 56, thereby elongating the mesh 40A. Materials of fabrication in this example again are "Teflon" for the body 52, and type 316 stainless steel for the bolt 20A, the discs 18A and 56, the nut 58, and the compression spring 42A.

Figure 7A:
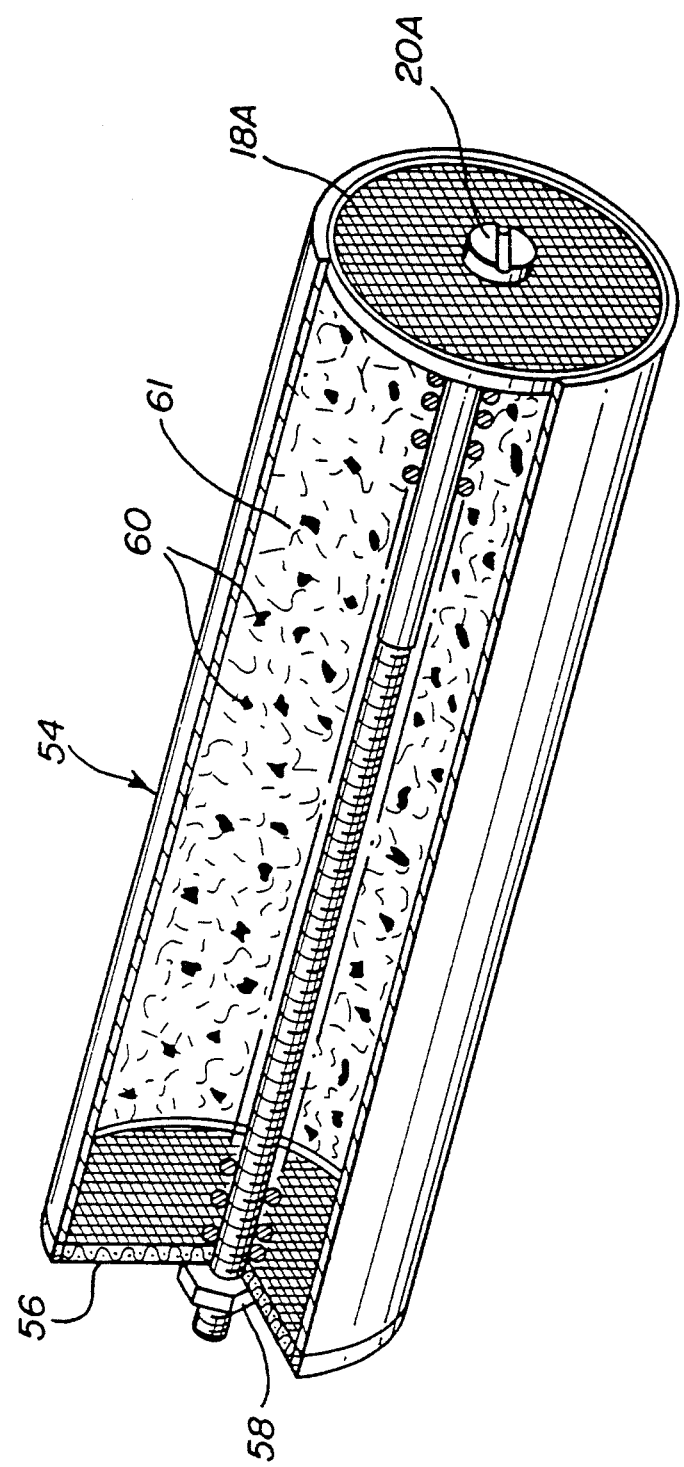
FIG. 7A illustrates another possible laminar flow element of the invention.

FIG. 7A illustrates other unique advantages of a porous, open celled, flexible material for constructing an adjustable laminar flow element. For example, desiccant granules 60 can be added to the steel mesh 40A of the laminar flow element 54 of FIG. 5. These desiccant granules could be silica gel or molecular sieves. In this manner the laminar flow element 54 will now operate as means for removing water or other solvents from gas streams passing through the element. Additionally, the strands of the steel mesh 40A can be coated with a suitable anti-static agent 61 (FIG. 7A) to provide an additional safety factor when the laminar flow element is being used to meter flammable gases, such as hydrogen and methane. Again, it should be noted that when filled with a steel mesh the laminar flow element will also provide the additional safety function of a flash arrestor.

Figure 8:
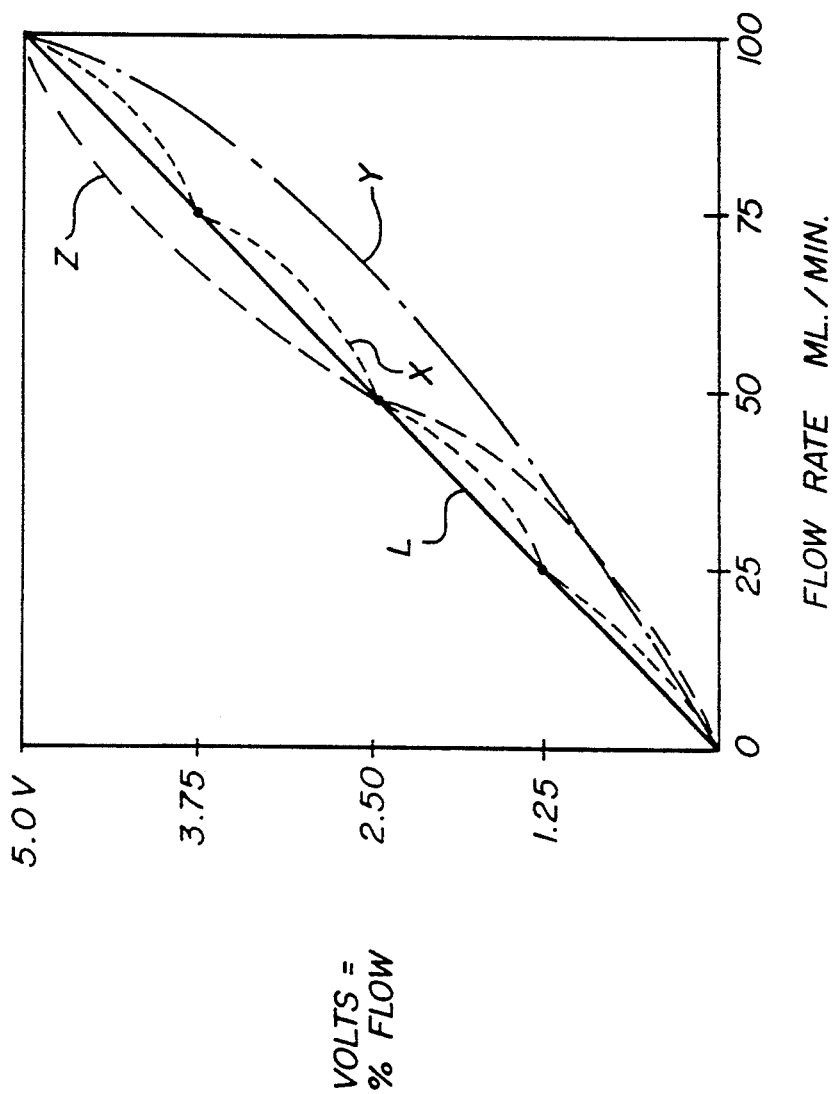
FIG. 8 is a chart illustrating improved fluid dynamics as obtained by a laminar flow element of the invention.

FIG. 8 graphically illustrates the uniquely favorable fluid dynamics of laminar flow, prior to adjusting the various potentiometers associated with the typical control ciruitry of such systems. The flow chart of FIG. 8 assumes a typical deviation of flow path from linearity of 1% or 2%, which is considered acceptable to the art. In FIG. 8 the line designated Y is a typical currently accepted deviation from linearity, with the line segments designated X representing the "pulling" into linearity of line Y by additional "trimmer" potentiometers. The line designated Z indicates another currently accepted deviation from linearity. In the instant invention the control circuitry will not require the at least two additional "trimmer" potentiometers, or the associated compensating circuit elements. The thermal mass flow meter of the invention approaches the ideal linearity much more closely, and without the need for the above described additional elements, as indicated by the line L of the flow chart of FIG. 8. The results are a more economical thermal mass flow meter, with significantly simplified required calibration procedures.

Since many changes could be made in the above constructions and many apparent widely different embodiments of this invention could be made without departing from the scope thereof, it is intended that all matter contained in the above description or shown in the accompanying drawings shall be interpreted as illustrative, and is to be limited only by the following claims.

What is claimed is:

1. A laminar flow element for facilitating the achievement of an adjustable, laminar fluid flow for a thermal mass flowmeter, comprising:
   (a) a conduit within said laminar flow element for fluid flow;
   (b) said conduit having an inlet and an outlet for said fluid flow;
   (c) said conduit containing a porous, open celled, flexible material;
   (d) said porous, open celled, flexible material creating a labyrinthine fluid flow path for a fluid as said fluid flows from said inlet of said conduit to said outlet of said conduit, thereby facilitating the achievement of said laminar fluid flow within said conduit when said fluid flows through said labyrinthine fluid flow path within said porous, open celled, flexible material;
   (e) means for adjusting said labyrinthine fluid flow path within said porous, open celled, flexible material so that the achievement of said laminar fluid flow is facilitated over an extended fluid flow range of possible rates of fluid flow;
   (f) said porous, open celled, flexible material being a metal mesh; and
   (g) said laminar flow element having means for removing solvents from said fluid.

2. A laminar flow element according to claim 1 wherein said means for removing said solvents from said fluid comprises absorbent particles mixed with said metal mesh.

3. A laminar flow element for facilitating the achievement of an adjustable, laminar fluid flow for a thermal mass flowmeter, comprising:
   (a) a conduit within said laminar flow element for fluid flow;
   (b) said conduit having an inlet and an outlet for said fluid flow;
   (c) said conduit containing a porous, open celled, flexible material;
   (d) said porous, open celled, flexible material creating a labyrinthine fluid flow path for a fluid as said fluid flows from said inlet of said conduit to said outlet of said conduit, fluid flow through said labyrinthine fluid flow path within said porous, open celled, flexible material;
   (e) means for adjusting said labyrinthine fluid flow path within said porous, open celled, flexible material so that the achievement of said laminar fluid flow is facilitated over an extended fluid flow range of possible rates of fluid flow;
   (f) said porous, open celled, flexible material being a metal mesh; and
   (g) said laminar flow element having means for antistatic protection for said fluid within said labyrinthine fluid flow path.

* * * * *